(12) United States Patent
Fox et al.

(10) Patent No.: US 7,229,121 B2
(45) Date of Patent: Jun. 12, 2007

(54) VEHICLE COVER

(76) Inventors: Kevin Duane Fox, 2847 E. Dartmouth, Mesa, AZ (US) 85213; Dennis Lynn Fox, 1616 E. Lehi Rd., Mesa, AZ (US) 85203

( * ) Notice: Subject to any disclaimer, the term of this patent is extended or adjusted under 35 U.S.C. 154(b) by 0 days.

(21) Appl. No.: 11/228,427

(22) Filed: Sep. 15, 2005

(65) Prior Publication Data

US 2007/0057528 A1    Mar. 15, 2007

(51) Int. Cl.
*B60P 7/04* (2006.01)
(52) U.S. Cl. .......................... 296/100.16; 296/100.01; 24/369; 24/370; 24/265 H
(58) Field of Classification Search ............... 296/98, 296/100.01, 100.11–100.16; 24/369, 370, 24/265 H, 265 C, 462, 907, 570; 248/304, 248/305
See application file for complete search history.

(56) References Cited

U.S. PATENT DOCUMENTS

| | | | |
|---|---|---|---|
| 3,146,824 A | | 9/1964 | Veilleux |
| 3,494,658 A | * | 2/1970 | Maes, Jr. ................ 296/100.15 |
| 3,882,575 A | * | 5/1975 | Jolly ............................ 24/661 |
| 4,272,119 A | | 6/1981 | Adams |
| 4,479,677 A | | 10/1984 | Gulette et al. |
| 4,563,034 A | | 1/1986 | Lamb |
| 4,607,876 A | | 8/1986 | Reed |
| 4,639,033 A | | 1/1987 | Wheatley et al. |
| 4,739,528 A | * | 4/1988 | Allen ............................ 5/119 |
| 4,807,921 A | | 2/1989 | Champie, III et al. |
| 5,050,924 A | * | 9/1991 | Hansen ................... 296/100.15 |
| 5,427,428 A | | 6/1995 | Ericson et al. |
| 5,431,474 A | * | 7/1995 | Burkey .................. 296/100.15 |
| 5,542,733 A | | 8/1996 | Kintz |
| 5,758,922 A | * | 6/1998 | Wheatley ............... 296/100.15 |
| 5,775,765 A | | 7/1998 | Kintz |
| 5,848,818 A | | 12/1998 | Flueckinger |
| 5,988,728 A | | 11/1999 | Lund et al. |
| 6,224,139 B1 | * | 5/2001 | Weyand ................. 296/100.16 |
| 6,435,595 B1 | | 8/2002 | Chenowth |
| 6,474,719 B2 | | 11/2002 | Henning |
| 6,499,791 B2 | * | 12/2002 | Wheatley ............... 296/100.16 |
| 6,585,309 B2 | * | 7/2003 | Dicke .................... 296/100.16 |
| 6,688,668 B2 | | 2/2004 | Stevens et al. |
| 6,779,827 B2 | * | 8/2004 | Clark .......................... 296/98 |
| 6,783,312 B2 | * | 8/2004 | Smith ......................... 410/97 |
| 6,832,803 B2 | | 12/2004 | Elliott |
| 6,981,734 B2 | * | 1/2006 | Martin ................... 296/100.12 |

* cited by examiner

*Primary Examiner*—D. Glenn Dayoan
*Assistant Examiner*—Greg Blankenship
(74) *Attorney, Agent, or Firm*—Advantia Law Group; Michael W. Starkweather; Jason P. Webb

(57) ABSTRACT

There is a tonneau or covering device for covering an open storage portion of a vehicle. The tonneau includes a cover, a cord, and/or a plurality of couplers, such as but not limited to hooks. The cord is disposed circumferentially about the cover and coupled thereto through sheathes. There are double-hook couplers including a first hook removably coupleable to a cord and a second hook coupled to the first hook and removably coupleable to the vehicle. The second hook may include a U-shaped member. The first hook may include a tapering hook opening. The first hook may include a flexible hook opening.

20 Claims, 5 Drawing Sheets

VEHICLE COVER

BACKGROUND OF THE INVENTION

1. Field of the Invention

The present invention relates to covering devices, specifically to vehicle covers.

2. Description of the Related Art

Vehicles having open storage portions, such as pick up truck beds, often benefit from a covering disposed over the open top of the storage portion. This is particularly important wherein a user may be storing/carrying materials that may be damaged by the elements or that may be advantageously hidden from view. For example, a vehicle may be carrying paper products that may be damaged by wind, rain, and/or sun. In another example, a vehicle may be carrying tools that may be advantageously covered, thereby helping prevent theft of the tools.

Various means of covering open storage portions of vehicles are known in the art. Past covers include hard and/or soft shells configured to be coupled to the vehicle. Covering devices may even include mechanical devices for retracting the covering device such as that disclosed in U.S. Pat. No. 4,563,034 to Lamb. Therein there is disclosed a retractable cover designed for use in covering the bed of a conventional pick up truck. The cover includes a pair of beaded side edges wherein each of the beaded side edges slidably engage a track or longitudinal opening molded in a slide member mounted to the side walls of a bed on a pick up truck. One end of the cover is fixed to a spring loaded, continuously biased, roller rotatably mounted to the forward section of the truck's bed in a plane below the plane of the extended truck cover. A flap is also provided to cover the roller as well as a means to seal the flap to the truck cover when fully extended. A locking mechanism is fixed at or near the tailgate of the truck's bed to maintain the extended, spring biased cover in an extended and locked position.

In another example, there is U.S. Pat. No. 6,688,668 to Stevens et al. wherein is disclosed a retainer system for vehicle soft tops and tonneau covers. The system includes a belt attached to the edge of the fabric of the top or tonneau cover and a channel member mounted on the vehicle to selectively receive the belt. The belt is provided with a stop mechanism to positively prevent the belt from peeling out of the retaining channel member farther than desired. In the preferred embodiments, the stop mechanism is a notch or cutout in the belt. With the present retainer system, the notch will effectively stop the peel or withdrawal of the belt from the retaining channel at a predetermined location along the channel. In this manner, the belt and attached top or tonneau cover can be partially removed from engagement along the channel member to make it easier and quicker for the operator to perform a number of desirable tasks.

Some covers include folding portions, such as that disclosed in U.S. Pat. No. 5,427,428 to Ericson et al. wherein is disclosed a folding cover for a pickup truck bed comprising of a plurality of substantially rigid material sheets hinged together using specially adapted hinges made of a flexible material, the flexible hinges extending the width of the sheets making the cover substantially leak-proof/weatherproof. In a second embodiment, the cover can be mounted on rollers which themselves can be rollably supported by a horizontal track mounted to one or both of the side rails of the pickup truck bed to make folding and unfolding of the cover easier.

Problems with prior art covering devices include cost of materials, complexity of configuration, reliability issues caused by too many parts, inability to change out parts easily, failure to accommodate varying load shapes and sizes, large storage requirements when not in use, complexity and/or difficulty in using/installing the device, weight of the device, difficulty installing on a variety of vehicles, and tangling of parts of the device.

What is needed is a covering device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available covering devices. Accordingly, the present invention has been developed to provide a covering device.

In one embodiment of the invention, there is a tonneau for covering an open storage portion of a vehicle. The tonneau may include a cover, a cord, and/or a plurality of couplers, such as but not limited to hooks. The cover may be configured to shelter the open storage portion of the vehicle. The cord may be disposed circumferentially about the cover and coupled thereto at three or more places about the cover. The plurality of couplers may be each coupleable to the cord and the vehicle and/or may be each configured to couple the cord to the vehicle.

The plurality of couplers may include a double-hook coupler including a first hook removably coupleable to a cord and a second hook coupled to the first hook and removably coupleable to the vehicle. The second hook may include a U-shaped member. There may also be a sheath extending along an edge of the cover and/or enveloping a portion of the cord. The first hook may include an eye diameter not substantially greater than a diameter of the cord. The first hook may include a tapering hook opening. The first hook may include a flexible hook opening. The double-hook coupler may include beveled edges. The cord may include an elastic material extending through a plurality of sheaths coupled to a perimeter of the cover.

In another embodiment, there is a covering device for use with a vehicle. The covering device may include a cover member, a cover aperture, a linear member, and/or a coupler. The cover aperture may be through the cover member. The linear member may be defined by the cover member and cover aperture. The coupler may include a cover hook and/or a vehicle hook. The cover hook may be removably coupleable to the linear member. The vehicle hook may be coupled to the cover hook and configured to removably couple to the vehicle.

The linear member may include longitudinal flexibility. The cover hook may include a flexible eye. The cover member may comprise an eight-sided polygon. The cover hook may include a hook opening smaller than a width of the linear member. The cover hook opening may include an outer opening width greater than an inner opening width. The cover hook may include a C-shape and the vehicle hook comprises a C-shape.

There may also be a plurality of cover apertures each disposed through the cover at a location proximate a stake holder of the vehicle when the covering device is in use. There may also be a plurality of linear members each defined by one of the plurality of cover apertures and the cover member. There may also be a plurality of couplers each simultaneously coupleable to a linear member and a stake holder. A cover member may include a planar member substantially impermeable to wind and water, a plurality of sheaths disposed proximate edges of the planer member and coupled thereto, and/or a cord disposed through the plurality of sheaths and thereby coupled to the planar member. The cover hook may be smaller than the vehicle hook and extends through a C-shaped member thereof.

In yet another embodiment, there is a covering device. The covering device may include a cover. The cover may include a planar member and first, second, and third edges. There may be first, second, and third sheaths coupled to each of the first, second, and third edges respectively. There may be a cord enveloped by and/or extending through the first, second, and third sheaths. There may be first, second, and third hooks removably coupleable to the cord, each including a first hook configured to removably couple to a vehicle and/or a second hook comprising a substantially flexible hook configured to removably and slidably couple to the cord.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
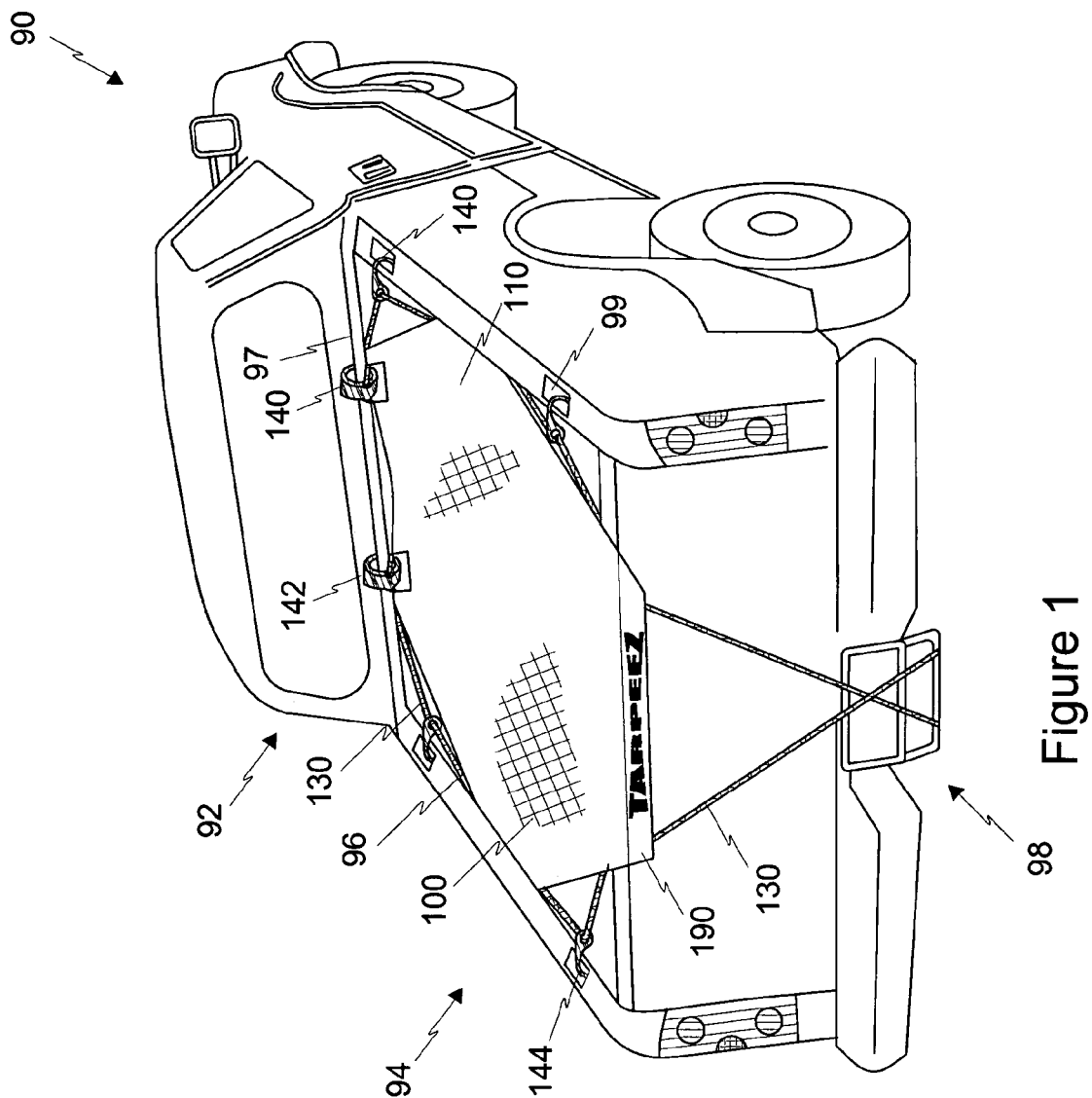
FIG. 1 illustrates a perspective view of a truck having a covering device according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more, features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Figure 2:
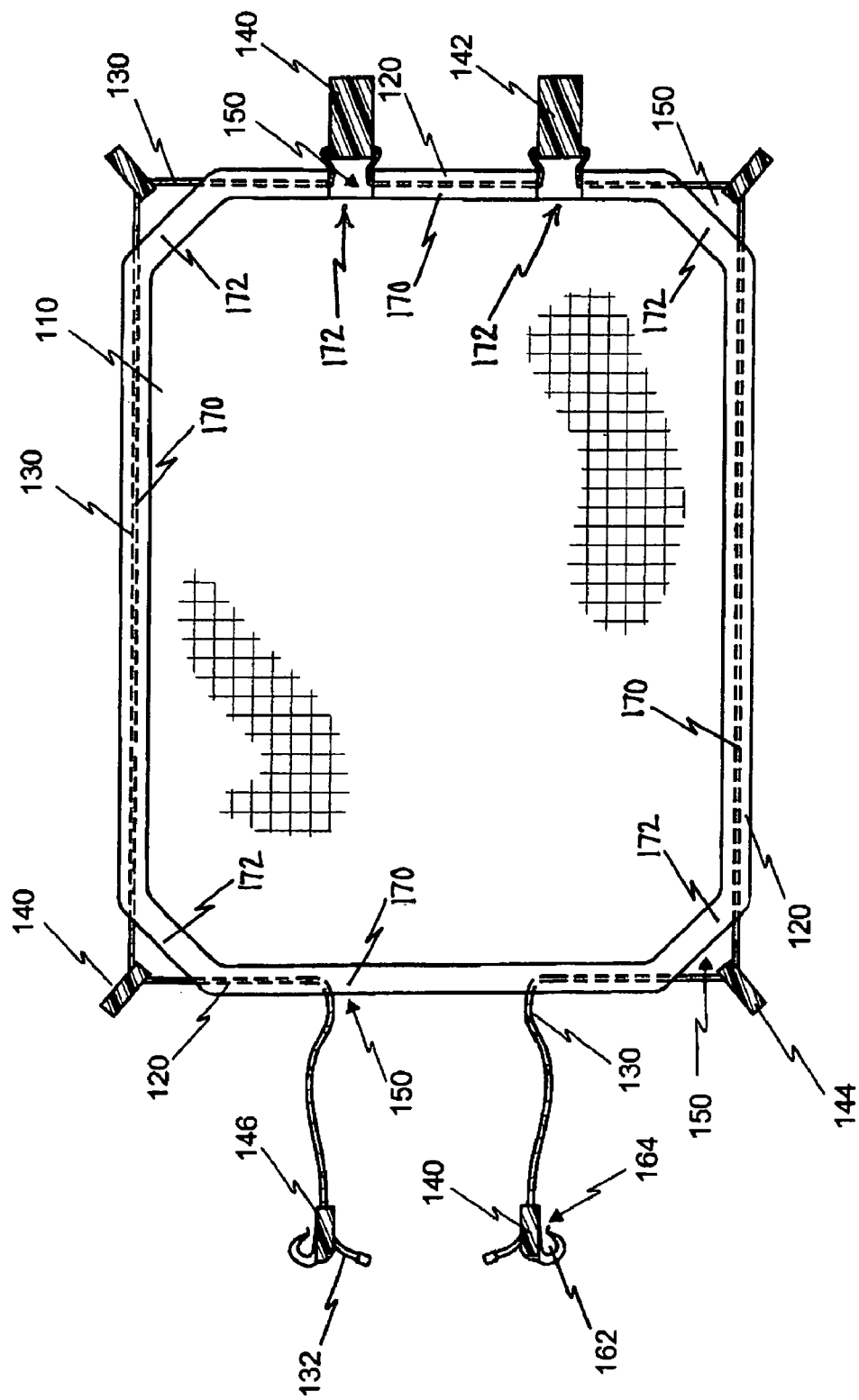
FIG. 2 illustrates a top plan view of a covering device according to one embodiment of the invention.

Looking to FIGS. 1 and 2 there is shown a covering device according to one embodiment. There is shown a truck 90 having a cab 92 and a bed 94. The cab 92 is disposed towards a front of the vehicle 90, the bed 94 towards the rear. Disposed over a bed aperture or storage portion aperature 96 is a covering device 100 such as the tonneau illustrated. The covering device 100 includes a cover member 110, having protruding sections 170 and recessive sections 172, a plurality of sheaths 120, a cord 130, and a pluarlity of hooks or hooks 140. The covering device is configured to shelter the open storage portion of the vehicle. Non-limiting examples of this include sheltering the open storage portion of the vehicle and/or one or more enclosed objects from the sun, wind, and/or rain. Complete protection is not required.

In operation, a user may couple the covering device 100 to a vehicle 90 by attaching the covering device 100 to a bed aperture 96 over a bed 94. The recessive sections 172 allow the cord 130 to extend beyond the cover member 110 so that the user may couple the plurality of hooks 140 to the cord 130 and to features around the bed apeture 96 such as but not limited to ridges, stake holes 99, lips, loops, and knobs. Advantageously, tension may be shared throughout the device through the cord 130. Also, the device may be easy to apply to the vehicle. The device may require only a small amount of storage space when not in use, for example, sufficiently small to be stowed under a seat. The device may be flexible, permitting application of the device over a wide variety of objects stored on/in a bed of a vehicle. The device may be module, may be easily repaired, and/or may facilitate easy replacement of parts. In one embodiment, the device may include a tab 190 that may extend over a back side of a vehicle when in use and may advantageously include advertising and/or branding material.

The cover member 110 typically includes a flexible, durable, water-proof/resistant, and/or wind-proof/resistant material such as durable fabric having a water-resistant polymer coating. The cover member 110 may include a sheet of material shaped as an eight-sided polygon, having protruding sections 170 and recessive sections 172 substantially similar to a rectangle including clipped corners, as illustrated. The cover member 110 typically is of a shape resembling a shape of the bed aperture 96. For a non-limiting example, for a generally rectangular shaped bed with a generally rectangular shaped bed aperture 96, a cover member 110 may be a sheet of fabric having a polymer coating, wherein the sheet may be a generally rectangular shape substantially corresponding in dimensions to dimensions of the bed aperture 96 of the vehicle. In one embodiment, a cover member 110 may be larger in one or more dimensions than a bed aperture 96. In one embodiment, a cover member 110 may be a plurality of sheets that may be coupled as layers and/or as sheet portions.

Coupled to the protruding sections 170 of the cover member 110 (and/or integral to the protruding sections 170 of the cover member 110) is shown a sheath or a plurality of sheaths 120. The sheath or plurality of sheaths 120 may be folded edges of the cover member 110 that may be coupled to the cover member 110 by stitching, thereby forming a cavity therein and providing a sheath and/or a plurality of sheaths 120. A sheath 120 may extend along one or more edges of the protruding sections 170 of the cover member 110. A sheath or plurality of sheaths 120 may substantially circumscribe the cover member 110 as illustrated.

There is illustrated a plurality of notches and/or notched corners 150 that may be described as sheath discontinuities 150, wherein a pair of sheaths 120 may terminate and such may result in an open space therebetween or where a sheath 120 may include an opening or notch 150. A sheath 120 may extend along one or more sides or edges of a cover member 110. Accordingly, where there is a sheath discontinuity or notch or notched corner 150 a cord 130 disposed within a sheath 120 may extend therefrom and may be accessible by a hook 140. Further, wherein a cord 130 may extend through a sheath discontinuity 150 and may be coupled to an object, such as a feature of a vehicle, the cord may pull against a sheath and may provide tension to a planar member attached thereto.

There is shown a cord or linear member 130. The cord 130 illustrated is threaded through the plurality of sheaths 120. A linear member 130 may be a portion of a cover member 110 that may have substantially similar structure as a portion of a cord 130 extending across a sheath discontinuity 150. A cord 130 is preferably elastic in one or more dimensions. In one embodiment, a cord is flexible. In one embodiment, a cord is longitudinally and/or compressively elastic. The illustrated cord 130 includes a pair of cord ends 132 extending from the cover member 110 out of a pair of tail sheaths 120. The cord ends 132 each include a hook or coupling member 140 that is configured to couple to a cord end 132 and to provide a tail hook 140 such as a hook that may be used to couple the hook 140 to a tail portion 98 of a vehicle 90, such as but not limited to coupling the tail hook 140 to a license plate or hitch of a pick-up truck.

There is shown a plurality of hooks or coupling members 140 that are each coupled to a cord or linear member 130. There is shown a pair of tail coupling members or tail hooks 140, a pair of head coupling members or head hooks 142, and two pairs of side coupling members or side hooks 144. A coupling member 140 may include a plurality of hook-shaped members that may be configured to couple to portions of vehicles and/or cords.

A tail hook 140 may be configured to couple to a cord 130. Preferably a tail hook is fixedly coupleable proximate a cord end 132. Further, it is preferable that the tail hook 140 be slidably adjustable when coupled proximate the cord end 132, thereby permitting adjustment of slack in the cord 130 when coupled to a vehicle 90. A tail hook 140 may be a clip.

A side hook 144 may be configured to couple to a feature of a vehicle such as but not limited to a stake hole 99 of a vehicle 90. A side hook 144 may be configured to be coupleable to a cord 130 that may extend from one sheath to another sheath, wherein the side hook 144 may couple to the cord at a sheath discontinuity 150 that may be proximate a feature of a vehicle that may be configured to receive the side hook 144. A side hook 144 may slidably couple to the cord 130. A side hook 144 may be a clip.

A fore hook 142 may be configured to couple to a feature of a vehicle such as but not limited to a fore ridge 97 of a vehicle, such as but not limited to fore ridges commonly forming forward boundaries of beds of pick-up trucks. A fore hook 142 may be configured to be coupleable to a cord 130 that may extend from one sheath to another sheath, wherein the side hook 144 may couple to the cord at a sheath discontinuity 150 that may be proximate a feature of a vehicle that may be configured to receive the fore hook 142. A fore hook 142 may slidably couple to the cord 130. A fore hook 142 may be a clip.

A hook, such as a fore hook 142, side hook 144, and/or aft hook 146, may include one or more eyes 162 each having a diameter. There may also be one or more hook openings 164 that may have a width. A hook opening 164 may be a tapering hook opening or funnel member 167 (see FIG. 4) such that an outer opening width is greater than an inner opening width as illustrated in the drawings, thereby facilitating entrance of a member into an eye 162 through a hook opening 164. A hook may have one or more beveled edges, thereby reducing wear and tear on members that may have physical contact with a hook. A hook may include flexible material, wherein a dimension of a hook may be adjustable under force. As a non-limiting example, an eye 162 may be flexible, such that an eye diameter and/or a hook opening width may be adjustable under force.

Figure 3:
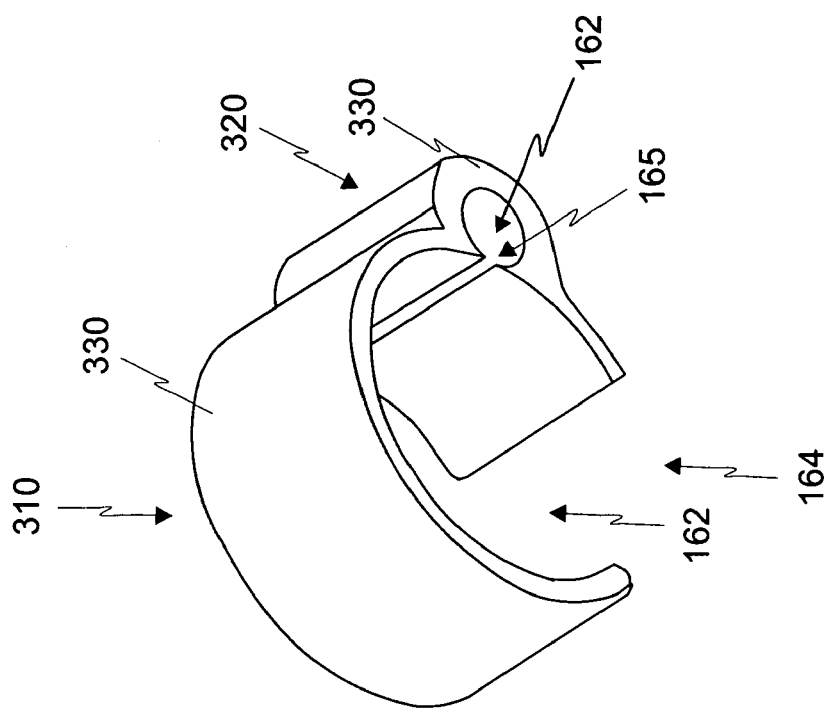
FIG. 3 illustrates a perspective view of a fore hook according to one embodiment of the invention.
Figure 3:
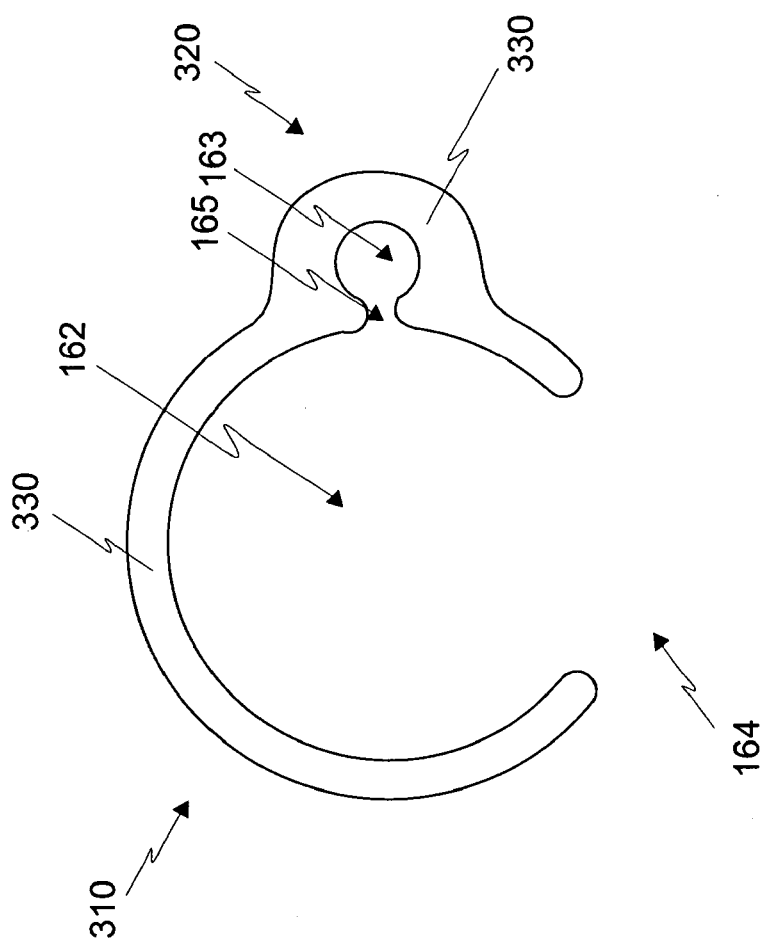

FIG. 3 illustrates a perspective view of a fore hook 142 according to one embodiment of the invention. There is shown a first fore hook member or vehicle hook 310 coupled to a second fore hook member or cover hook 320. As illustrated, the second, fore hook member 320 may extend from the first fore hook member 310. The first fore hook member 310 includes a semi-circular shaped portion 330 and a first fore hook opening 164.

The semi-circular shaped portion 330 includes an eye 162 having an eye diameter. Preferably, an eye diameter is substantially equal to or greater than a diameter or width of a member intended to be disposed therein. Preferably the semi-circular shaped and/or C-shaped portion 330 is substantially flexible such that it may be deformable when applied to a surface larger than the first fore hook opening 164. Also, preferably, the semi-circular shaped portion is substantially rigid, such that typical forces applied to the fore hook 142 when in use and intended to remain coupled to a vehicle do not deform the semi-circular member 330 sufficient to dislodge the fore hook 142 from the vehicle. In one embodiment, a first fore hook opening 164 is smaller than a ridge width such that coupling the fore hook 142 to the ridge 97 (see FIG. 1) requires an application of force sufficient to deform the fore hook 142 sufficient to open the first fore hook opening 164 wide enough to allow passage of the ridge 97 therethrough.

The second fore hook member 320 includes a semi-circular shaped and/or C-shaped portion 330 and a second fore hook opening 165. The semi-circular shaped portion 330 includes an eye 163 having an eye diameter. Preferably, an eye diameter is substantially equal to or greater than a diameter of a member intended to be disposed therein. Preferably the semi-circular shaped portion 330 is substantially flexible such that it may be deformable when applied to a surface larger than the second fore hook opening 165. Also, preferably, the semi-circular shaped portion is substantially rigid, such that typical forces applied to the fore hook 142 when in use and intended to remain coupled to a cord 130 do not deform the semi-circular member 330 sufficient to dislodge the fore hook 142 from the cord. In one embodiment, a second fore hook opening 165 is smaller than a cord width or diameter such that coupling the fore hook 142 to the cord 130 requires an application of force sufficient to deform the fore hook 142 sufficient to open the second fore hook opening 165 wide enough to allow passage of the cord 130 therethrough.

Figure 4:
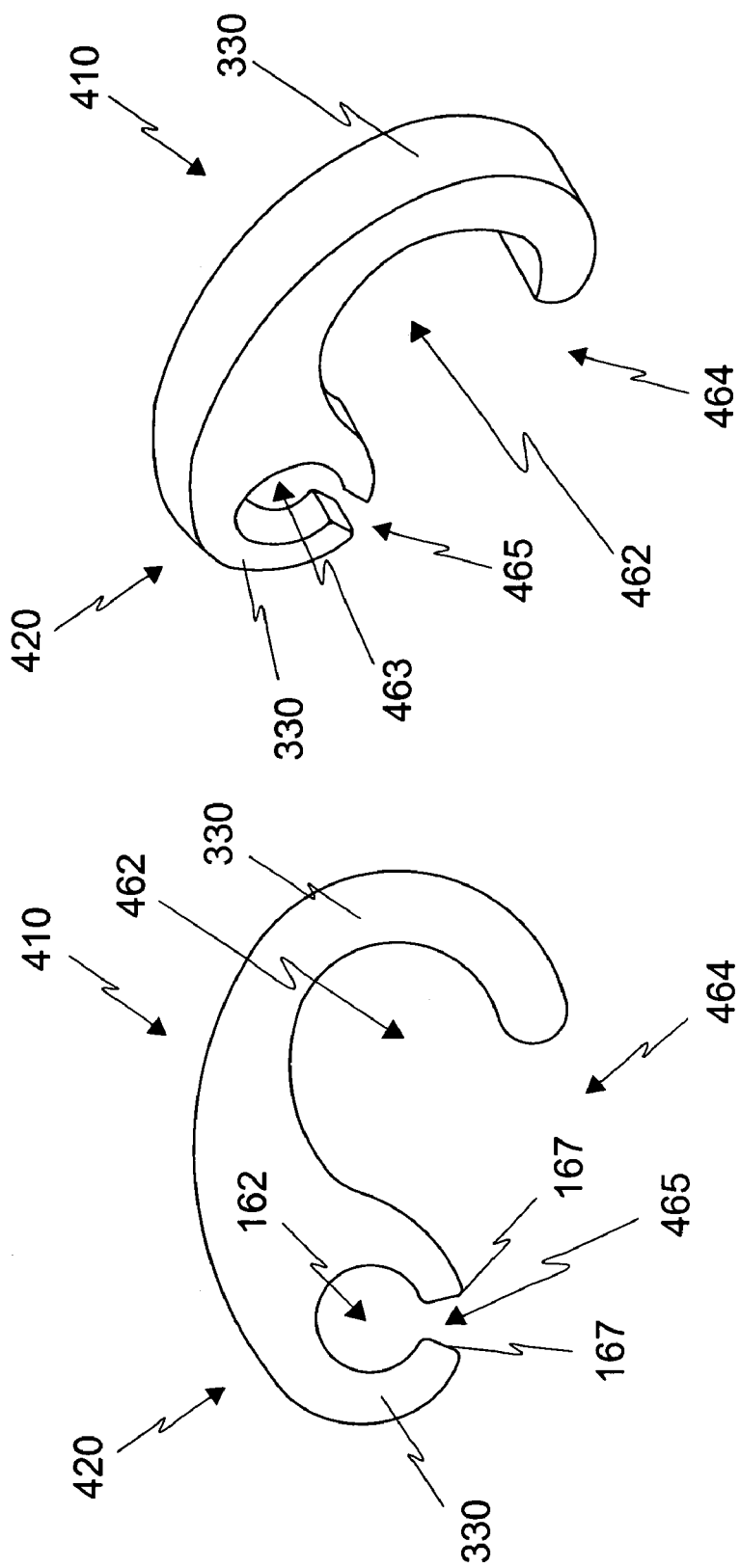
FIG. 4 illustrates a perspective view of a side hook according to one embodiment of the invention.

FIG. 4 illustrates a perspective view of a side hook 144 according to one embodiment of the invention. There is shown a first side hook member or vehicle hook 410 coupled to a second side hook member or cover hook 420. The first side hook member 410 includes a semi-circular shaped and/or C-shaped portion 330 and a first side hook opening 464. The semi-circular shaped portion includes an eye 462 having an eye diameter. Preferably, an eye diameter is substantially equal to or greater than a diameter of a member intended to be disposed therein. Preferably the semi-circular shaped portion 330 is substantially flexible such that it may be deformable when applied to a surface larger than the first fore hook opening 164. Also, preferably, the semi-circular shaped portion is substantially rigid, such that typical forces applied to the side hook 144 when in use and intended to remain coupled to a vehicle do not deform the semi-circular member 330 sufficient to dislodge the side hook 144 from the vehicle.

The second side hook member 420 includes a semi-circular shaped and/or C-shaped portion 330 and a second side hook opening 465. The semi-circular shaped portion 330 includes an eye 463 having an eye diameter. Preferably, an eye diameter is substantially equal to or greater than a diameter of a member intended to be disposed therein. Preferably the semi-circular shaped portion 330 is substantially flexible such that it may be deformable when applied to a surface larger than the second side hook opening 465. Also, preferably, the semi-circular shaped portion is substantially rigid, such that typical forces applied to the side hook 144 when in use and intended to remain coupled to a cord 130 do not deform the semi-circular member 330 sufficient to dislodge the side hook 144 from the cord. Preferably, the second side hook opening is radially disposed at an angular location about the eye substantially perpendicular to a long axis of the side hook, thereby reducing a likelihood of dislodging from a cord wherein the cord may experience substantially horizontal vibration, tension, and/or impulse(s). In one embodiment, a second side hook opening 465 is smaller than a cord width or diameter such that coupling the side hook 144 to the cord 130 requires an application of force sufficient to deform the side hook 144 sufficient to open the second side hook opening 465 wide enough to allow passage of the cord 130 therethrough.

Figure 5:
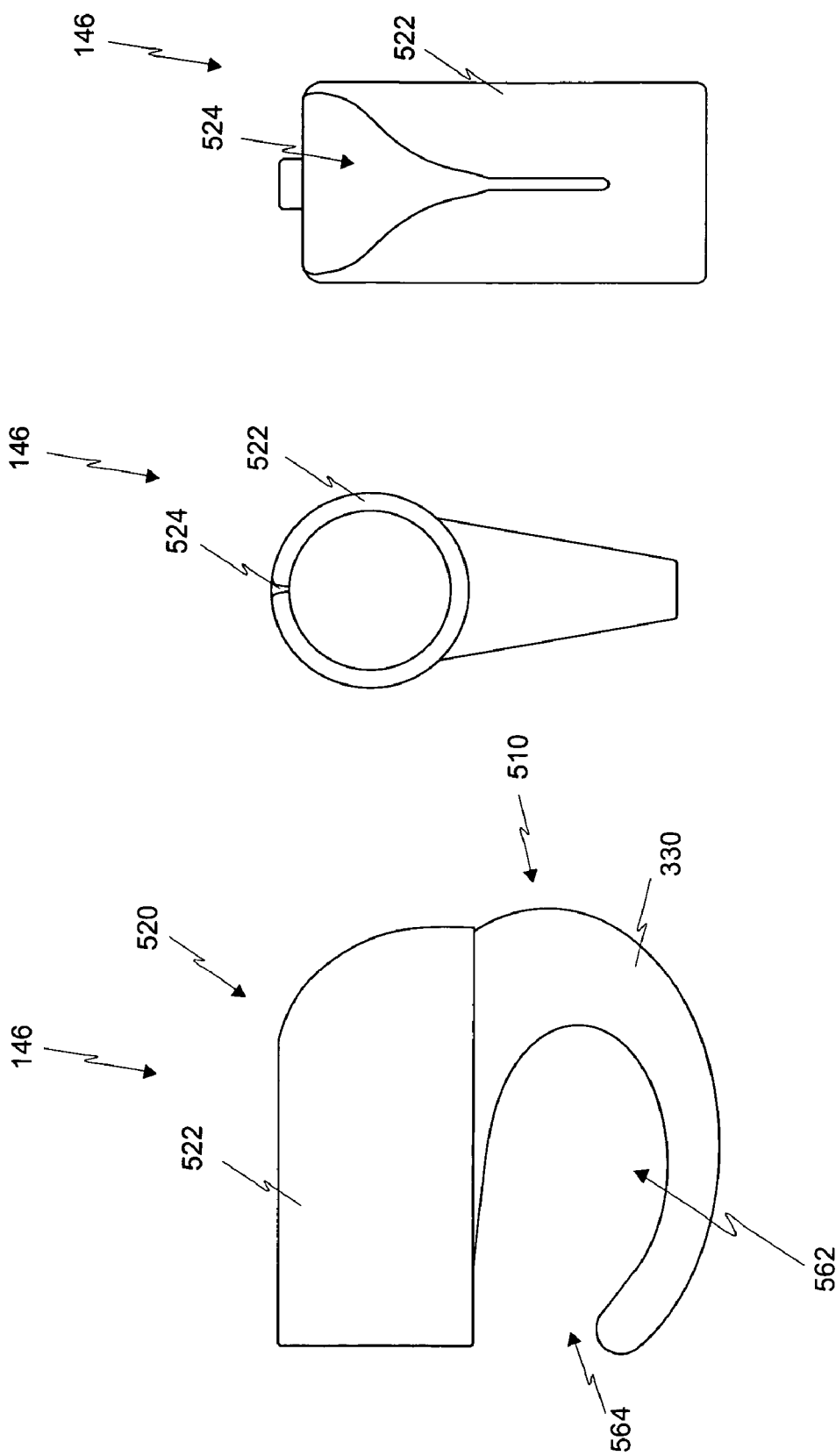
FIG. 5 illustrates a perspective view of an aft hook according to one embodiment of the invention.

FIG. 5 illustrates a perspective view of an aft hook 146 according to one embodiment of the invention. There is shown a first aft hook member 510 coupled to a second aft hook member 520. The first aft hook member 510 includes a semi-circular shaped and/or C-shaped or U-shaped portion 330 and a first aft hook opening 564. Preferably the semi-circular shaped portion is substantially rigid, such that typical forces applied to the side hook 144 when in use and intended to remain coupled to a vehicle do not deform the semi-circular member 330 sufficient to dislodge the side hook 144 from the vehicle. The semi-circular shaped portion includes an eye 562 having an eye diameter. Preferably, an eye diameter is substantially equal to or greater than a diameter of a member intended to be disposed therein. Because an aft hook 146 may be subject to stronger forces than a side or fore hook, the aft hook is preferably less flexible than the side and/or fore hooks and is preferably coupled to a portion of the vehicle without necessary deformation of the size of the aft hook opening 564.

The second aft hook member 520 includes a tube portion 522 and a tapering slot 524. The tube portion 522 includes a tube diameter at least substantially equal to a diameter or width of the cord 130. The tapering slot 524 is positioned through the tube portion 522 such that a cord 130 extending through the tube portion 522 may be pulled back against and through the tapering slot 524. The tapering slot 524 preferably includes a maximum width substantially equal to or greater than a width of the cord 130. The tapering slot preferably includes a smaller than maximum width smaller than a width of the cord 130.

Accordingly, in operation, a cord may extend through the tube portion 522 and may be pulled into and through the tapering slot 524 therein becoming wedged. Tension from the cord 130 may pull against the tapering slot such that additional tension drives the cord deeper into the tapering slot 524 thereby enhancing the coupling strength between the cord and the tapering slot 524. Further, a knot may be tied in the cord to more securely attach the cord to the second aft hook member 520. Additionally, the cord may be pulled out of the tapering slot 524 to adjust a length of the cord 130 and then reinserted into the tapering slot, thereby enabling a user to slidably adjust a length and/or tension of a cord.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the figures illustrate single piece couplers, it is envisioned that a hook or coupler may comprise a plurality of pieces, structures, attachments, divisions, etc.

Additionally, although FIG. 2 illustrates substantially linear edges for the hooks, the hooks may have a variety of shapes as seen from the perspective of FIG. 2. In particular, hooks may have curved portions, rounded edges, narrow regions, bulbous regions each of which may be design choices or may contribute to a flexibility, stability, and/or attachment functionality of the hook.

It is expected that there could be numerous variations of the design of this invention. An example is that the cover member may be triangular, or any other shape and may include additional notches configured to provide attachment locations for a variety of vehicles.

Finally, it is envisioned that the components of the device may be constructed of a variety of materials. There may be plastics, metals, organic products, fibers, woven fibers, polymers, ceramics, composites, minerals, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A covering device for use with a vehicle, comprising:
   a cover member;
   a cover aperture extends through the cover member;
   a linear member defined by the cover member and cover aperture; and
   a coupler, including:
      a cover hook removably coupleable to the linear member; and
      a vehicle hook coupled to the cover hook and configured to removably couple to the vehicle, wherein the cover hook is smaller than the vehicle hook and extends though a C-shaped portion thereof.

2. The covering device of claim 1, wherein the linear member comprises longitudinal flexibility.

3. The covering device of claim 2, wherein the cover hook comprises a flexible eye.

4. The covering device of claim 1, wherein the cover member comprises an eight-sided polygon.

5. The covering device of claim 2, wherein the cover hook includes a hook opening small than the width of the linear member.

6. The covering device of claim 5, wherein the cover hook opening comprises an outer opening greater than an inner opening width.

7. The covering device of claim 1, wherein the cover hook comprises a C-shape and the vehicle hook comprises a C-shape.

8. The covering device of claim 1, further comprising:
   a plurality of cover apertures each disposed through the cover at a location proximate a stake holder of the vehicle when the covering device is in use;
   a plurality of linear members each defined by one of the plurality of cover apertares and the cover member; and
   a plurality of couplers each simultaneously coupleable to a liner member and a stake holder.

9. The covering device of claim 1, wherein the cover member comprises:
   a planar member substantially impermeable to wind and water,
   a plurality of sheaths disposed proximate edges of the protruding scotions of the planar member and coupled thereto; and
   a cord disposed through the plurality of sheaths and thereby coupled to the planar member.

10. The covering device of claim 1, wherein the vehicle hook comprises a U-shaped member.

11. The covering device of claim 1, wherein the cover book comprises a tapering book opening.

12. The covering device of claim 1, wherein the cover hook includes a flexible hook.

13. The covering device of claim 1, wherein the coupler includes beveled edges.

14. A tonneau for covering an open storage portion of a vehicle, comprising:
   a cover configured to shelter the open storage portion of a vehicle, the cover including:
      a plurality of protruding sections; and
      a plurality of recessive sections;
   a cord disposed circumferentially about the cover and coupled thereto at a minimum of three places about the cover, wherein the cord is coupled to the cover at the protruding sections of the cover and spans the recessive sections; and
   a plurality of couplers, each coupleable to the cord along the recessive sections of the cover and the vehicle, each configured to couple the cord to the vehicle, each coupler including:
      a first hook removably coupleable to the cord along the recessive sections of the cover; and
      a second hook coupled to the first hook and removably coupleable to the vehicle, wherein the first hook is smaller than the second hook and extends through a C-shaped portion thereof.

15. The tonneau of claim 14, wherein the second hook comprises a U-shaped member.

16. The tonneau of claim 14, further comprising a sheath extending along an edge of a protruding section of the cover and enveloping a portion of the cord.

17. The tonneau of claim 14, wherein the first hook includes an eye diameter not substantially greater than a diameter of the cord.

18. The tonneau of claim 14, wherein the first hook includes a flexible tapering hook opening.

19. The tonneau of claim 14, wherein the double-hook coupler includes beveled edges.

20. The tonneau of claim 14, wherein the cord comprises an elastic material extending through a sheath coupled to a protruding section of the cover.

* * * * *